UNITED STATES PATENT OFFICE.

KARL SCHIRMACHER, OF HÖCHST-ON-THE-MAIN, GERMANY, ASSIGNOR TO THE FARBWERKE, VORMALS MEISTER, LUCIUS & BRÜNING, OF SAME PLACE.

BLACK AZO DYE AND PROCESS OF MAKING SAME.

SPECIFICATION forming part of Letters Patent No. 627,783, dated June 27, 1899.

Application filed October 31, 1898. Serial No. 695,004. (Specimens.)

*To all whom it may concern:*

Be it known that I, KARL SCHIRMACHER, doctor of philosophy, a citizen of the Empire of Germany, residing at Höchst-on-the-Main, Germany, have invented certain new and useful Improvements in the Manufacture of Black Monoazo Dyestuffs, of which the following is a specification.

I have found that by the treatment of diazotized picramic acid with naphtholsulfonic acids which are amidated monoazo dyestuffs may be produced which dye wool direct black or on subsequent treatment with chromates and are characterized by their fastness and property of dyeing evenly.

As amidated naphtholsulfonic acids may be, for instance, employed: 2:8:6; 1:8:4; 1:5:7; 2:5:7 amidonaphtholsulfonic acids; 1:8:3:6; 2:8:3:6; 1:8:4:6 amidonaphtholdisulfonic acids; 2:5:7 ethylamidonaphtholsulfonic acid; 1:8:3:6 ethylamidonaphtholdisulfonic acid; 1:5:2:7 and 1:3:6:8 diamidonaphtholsulfonic acids.

I illustrate my process by the following example: 22.2 kilos of sodium salt of picramic acid are dissolved in water, to which are added 6.9 kilos of nitrite. This solution is run into a mixture of forty kilos of hydrochloric acid and one hundred kilos of ice-water, the whole being stirred for a short time. The diazo compound separates out mostly in yellow-green crystals. If this solution be run into a solution of 34.2 kilos of amidonaphthol disulfonic acid "H" and thirty kilos of soda in water, the mass becomes blue-red, and the resulting dyestuff separates out in laminæ of bronze luster. To complete the reaction, the mixture is well stirred during six hours. It is then heated to 100° centigrade and salted out. When dried, the dyestuff is in the form of a black powder of bronze luster, soluble in water with a red-blue color.

The dyestuff dyes wool in an acid-bath in blue-black shades, which on a subsequent treatment with bichromate become deep green, very fast to washing, soap, and fulling.

Having now described my invention, what I claim is—

1. The process for the manufacture of a black dyeing monoazo dyestuff which consists in treating diazotized picramic acid with naphtholsulfonic acids containing amido groups, substantially as described.

2. Process for the manufacture of a black dyeing monoazo dyestuff which consists in allowing diazotized picramic acid to act upon 1:8:3:6 amidonaphtholdisulfonic acid "H," substantially as described.

3. As a new product, the black dyeing monoazo dyestuff from diazotized picramic acid and naphtholsulfonic acids containing amido groups, being a dark-black powder, soluble in water, insoluble in alcohol, benzene or petroleum, soluble in concentrated sulfuric acid with a red color.

4. As new product, the black dyeing monoazo dyestuff from diazotized picramic acid and 1:8:3:6 amidonaphtholdisulfonic acid, being a black powder of greenish luster soluble in hot water, insoluble in alcohol, benzene, petroleum and soluble in concentrated sulfuric acid with a red color.

In testimony that I claim the foregoing as my invention I have signed my name in presence of two subscribing witnesses.

KARL SCHIRMACHER.

Witnesses:
   HEINRICH HAHN,
   ALFRED BRISBOIS.